July 6, 1937.  W. T. CRODEN  2,086,120
CONTROL SYSTEM
Filed Dec. 21, 1934
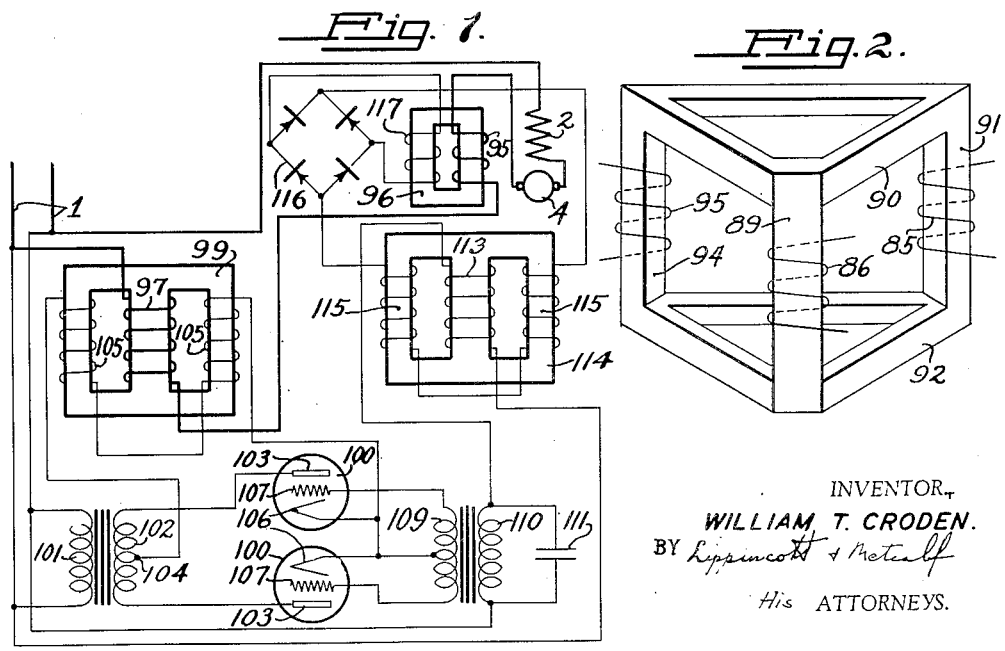
INVENTOR,
WILLIAM T. CRODEN.
BY Lippincott + Metcalf
His ATTORNEYS.

Patented July 6, 1937

2,086,120

UNITED STATES PATENT OFFICE 2,086,120

CONTROL SYSTEM

William T. Croden, Cabazon, Calif.

Application December 21, 1934, Serial No. 758,628

5 Claims. (Cl. 171—119)

REISSUED
MAR 26 1940

This invention relates to alternating current control systems, either single or polyphase and particularly to systems for controlling alternating current motors having series characteristics.

Among the objects of this invention are: To provide a system of control for alternating current motors of the commutator type which will maintain the speed of the motor constant as the load is applied thereto; to provide means and methods for adjusting the speed of commutator motors so as to maintain it at a selected value under varying loads; to provide a method of regulating alternating current power so as to maintain or raise the voltage thereof as the load is increased; and to provide a system wherein the regulation of voltage is a non-linear function of the load.

This invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawing:

Figure 1 is a schematic diagram of the system of my invention as applied to the control of a single phase series motor.

Figure 2 is a schematic diagram of a magnetic circuit which is particularly applicable to the reactors used in my system of control.

Although primarily devised for control of the speed characteristics of series motors, the control system of my invention may be utilized wherever an alternating current power source and load exists, the load having characteristics which make this type of control desirable. In general terms the system comprises a reactive element having a saturable core, i. e., a core whose permeability is a function of its degree of magnetization. This reactive element may be either a simple reactor, introducing a voltage drop into the line through its self-inductive property, or it may be a bucking or boosting transformer, into whose operation the property of mutual reactance enters. A current transformer is connected in series with the reactor and the load, and a rectifier is provided which, fed by the current transformer, provides a direct current component which is utilized to vary the saturation of the reactor core in accordance with the load drawn. It is usually preferable, particularly when the invention is used for motor control purposes, that the direct current supplied by the rectifier be an alinear function of the load, and means are preferably provided for accomplishing this purpose.

The operation of the invention may be more clearly understood by reference to the various details embodied and illustrated in the drawing. Of these, Figure 1 is typical. In this figure the supply line I represents a regular alternating current service lead, which, for the purposes of this description may be taken as the source of power, it being understood that a local generator is a complete equivalent. Tracing these leads, the line I connects first through the field 2 and armature 4 of the series motor which represents the load or point of utilization. The series motor is typical of devices whose speed varies inversely with the mechanical load imposed thereon. Such devices are highly desirable for many services in that they exert large starting forces, but once brought to a desired speed they require constant regulation to maintain that speed with varying load. This regulation may be accomplished by varying resistance or reactance in series with the device, reactance variation being more economical of power. The equipment next to be described applies such variation automatically to maintain the speed practically constant at a predetermined value through the medium of a saturable core reactor whose reactance is changed in accordance with load by changing a rectified current flowing in a d-c winding.

The primary coil 95 of a current transformer 96, and the coil 97 of a saturable core reactor 99 are connected in series with the motor and line. The d-c components in the reactor core are supplied through a pair of rectifier tubes 100 of the so-called "grid-glow" or "Thyratron" type. These tubes are supplied by a transformer whose primary 101 is bridged across the line I, and whose secondary 102 is connected between the anodes 103 of the two rectifiers. The center tap 104 of the secondary coil connects through the saturating coils 105 of the reactor 99 and thence back to the cathode 106 of the rectifier tube. The grids 107 of these tubes connect to the opposite ends of a transformer winding 109, whose neutral point also connects with the cathode 106.

The primary coil 110 of the transformer is bridged by a condenser 111, and is connected between one side of the line I and the winding of one coil 113 of a second saturable reactor 114, and thence back to the other side of the line I.

The saturating windings 115 of the reactor 114 are supplied by the bridge-type rectifier 116 from a secondary 117 of the current transformer 96.

In this arrangement the current supplied by the current transformer 96 may be extremely small, since its function is merely to change the phase of the voltage supplied to the grids 107 of the grid-glow rectifiers. The actual power drawn by these grids will be small, for the grids merely serve to determine at what portion of the cycle the tubes 100 shall start to draw current. The control of rectifiers of the grid-glow type by change of phase of the grid voltage is sufficiently well known so that it is unnecessary to describe it here, it being obvious that the division of voltage between the transformer primary 110 and the reactor coil 113 will change in both phase and magnitude as the saturation of the reactor core 114 changes, and that through this means very large changes in the saturation of the reactor core 99 may be accomplished with relatively small changes in the power supplied by the current transformer 96. The voltage supplied across the motor or other load may therefore be caused to vary very rapidly with slight changes in load, thereby enabling very wide adjustment of speed-load characteristics.

It is to be understood that the drawing shows but one of a large number of modifications of my invention using rectifier tubes of the grid-glow type, since there are many circuits using these tubes in either full wave or half wave relationship which are well known in the art.

The usual adjustment gives substantially full speed of the motor at either no load or some predetermined fractional load or maintains substantially constant any predetermined fractional speed with varying load. At greater loads the increased voltage on the motor will then maintain it at substantially this same speed. Obviously, however, it is possible by varying the constants of the control apparatus to maintain the usual series-motor characteristics for all loads up to normal full load, and maintain the speed at full load value for overloads, or to accentuate differences of speed with load, should this be desirable for any reason.

It will be obvious that many modifications are possible in the core structure of the various reactors and transformers using my system. Certain of the various windings may safely be placed on different legs of the same core structure, in order to save the total amount of material used, but in attempting this due care should be exercised that unexpected voltages be not developed across the other windings. It is especially desirable that care should be given to the design of the saturated reactor, since it is possible to develop fairly high voltages in the various portions of the d-c windings even though the total voltage across the terminals may be zero.

One desirable form of core for such reactors is illustrated schematically in Figure 6. In this case the a-c windings 85 and 86 are connected either in series or in parallel, so as to excite the magnetic circuit comprising the legs 89, 90, 91 and 92 of the core. Under these circumstances the magnetomotive force that is developed across the leg 94 is extremely small, since if the device be truly symmetrical the magnetomotive forces across its ends are such as to balance out. It is upon this leg 94 that the saturating winding 95 is disposed, the magnetic circuit of this winding necessarily including the two legs 89 and 91, which are accordingly changed in saturation by the current through this coil.

I claim:

1. In an alternating current system comprising a source of power and a load, means for regulating the power supplied to said load comprising a current transformer and a saturable reactor in series with said load, a rectifier system including rectifier tubes of the grid-glow type connected to supply a direct current component to said saturable reactor, a circuit including a second saturable reactor connected to supply a control voltage to said grid-glow tubes, and a rectifier supplied by said current transformer and connected to supply a direct current component to said second reactor.

2. In an alternating current system comprising a source of power and a load, a saturable reactor and a current transformer connected in series with said load, means connected across said source for supplying a saturating current for said reactor, a rectifier system supplied by said current transformer, and means controlled by the output of said current transformer and including a second saturable reactor for controlling the saturating current supplied to said first mentioned saturable reactor.

3. In an alternating current system comprising a source of current and a load, means for regulating the power supplied to said load from said source comprising an impedance and a current transformer in series with said load, a rectifier system connected to the output of said current transformer, a saturable reactor connected to derive its saturating current from said rectifier system, means including a tube of the grid-glow type for controlling said impedance, and a control circuit for said grid-glow tube including said saturable reactor.

4. In combination with an alternating current motor having series characteristics, means for increasing with increasing loads the voltage supplied to said motor from a substantially constant source, comprising a saturable reactor and a current transformer connected in series with said source and motor, a rectifier system connected to supply saturating current to said saturable reactor, and means controlled by current from said transformer and comprising a second rectifier and saturable reactor for controlling the current supplied by said rectifier system.

5. In combination with an alternating current motor having series characteristics, means for increasing with increasing load the voltage supplied to said motor from a substantially constant potential source comprising a saturable reactor and a current transformer connected in series with said source and motor, a grid glow tube rectifier system connected to supply saturating current to said saturable reactor, and means controlled by current from said transformer and comprising a second rectifier and saturable reactor for controlling the current supplied by said rectifier system.

WILLIAM T. CRODEN.